United States Patent [19]

Blaise et al.

[11] Patent Number: 4,851,479
[45] Date of Patent: Jul. 25, 1989

[54] HETEROGENEOUS COPOLYMER OF VINYLIDENE FLUORIDE AND CHLOROTRIFLUOROETHYLENE PROCESS OF PREPARATION OF THE HETEROGENEOUS COPOLYMER

[75] Inventors: Jean Blaise, Lyons; Patrick Kappler, Ecully, both of France

[73] Assignee: Atochem, Puteaux, France

[21] Appl. No.: 146,814

[22] Filed: Jan. 22, 1988

[30] Foreign Application Priority Data

Feb. 3, 1987 [FR] France ................... 87 01283

[51] Int. Cl.$^4$ .......................... C08F 259/00
[52] U.S. Cl. .................................. 525/276
[58] Field of Search .................. 526/249; 525/276

[56] References Cited

U.S. PATENT DOCUMENTS

| | | | |
|---|---|---|---|
| 3,580,975 | 5/1971 | Rademacher | 525/276 |
| 3,798,287 | 3/1974 | Murayawa et al. | 525/276 |
| 3,929,934 | 12/1975 | Moore et al. | 525/276 |
| 4,151,225 | 4/1979 | Buning | 525/276 |
| 4,469,846 | 9/1984 | Khan et al. | 525/276 |
| 4,612,351 | 9/1986 | Caporiccio et al. | 526/249 |

FOREIGN PATENT DOCUMENTS

| | | | |
|---|---|---|---|
| 629174 | 10/1961 | Canada | 526/249 |
| 0131203 | 1/1985 | European Pat. Off. | 526/249 |
| 51-149392 | 12/1976 | Japan . | |
| 0164611 | 9/1983 | Japan | 525/276 |
| 742908 | 1/1956 | United Kingdom | 526/249 |
| 783933 | 10/1957 | United Kingdom | 526/249 |
| 1150190 | 4/1969 | United Kingdom | 526/249 |

Primary Examiner—Joseph L. Schofer
Assistant Examiner—N. Sarofim
Attorney, Agent, or Firm—Burgess, Ryan & Wayne

[57] ABSTRACT

Heterogeneous copolymers of vinylidene fluoride and chlorotrifluoroethylene are obtained by copolymerization in suspension or emulsion in two stages. In a first stage the vinylidene fluoride and the chlorotrifluroethylene are copolymerized, and in a second stage the polymerization of vinylidene fluoride is continued after discontinuance of the introduction of chlorotrifluoroethylene.

5 Claims, 1 Drawing Sheet

HETEROGENEOUS COPOLYMER OF VINYLIDENE FLUORIDE AND CHLOROTRIFLUOROETHYLENE PROCESS OF PREPARATION OF THE HETEROGENEOUS COPOLYMER

FIELD OF THE INVENTION

This invention is directed to a heterogeneous copolymer of vinylidene fluoride ($VF_2$) and chlorotrifluoroethylene ($C_2F_3Cl$) comprised of nodules of vinylidene fluoride elastomer and chlorotrifluoroethylene dispersed in a matrix formed by a quasi polymer of vinylidene fluoride. The copolymer is obtained by copolymerization of $VF_2$ AND $C_2F_3Cl$ so as to obtain an elastomer on which the $VF_2$ is polymerized.

BACKGROUND OF THE INVENTION

Poly vinylidene fluoride (PVDF) is a polymer known for its excellent properties, particularly mechanical firmness and firmness in respect to chemical agents. However, it has the disadvantage of lacking suppleness and hence, this disadvantage limits its use in applications where this property is required, such as in tubular materials that must be rolled up.

To overcome the disadvantage, it has been proposed to copolymerize the $VF_2$ with $C_2F_3Cl$, as, for example, has been described in Japanese Patent Application No. 51-149392/76. According to this patent, the copolymerization is carried out by uniformly adding the $C_2F_3Cl$ to the reaction medium containing the entire amount of the $VF_2$. In this type of copolymerization the speed at which the $C_2F_3Cl$ is introduced to the $VF_2$, taking into consideration the differences of speed of reaction between the two monomers, that of the $VF_2$ being slower than that of the $C_2F_3Cl$, is adjusted so as to obtain a homogeneous copolymer of the type ($—CF_2 —CH_2 —CF_2 —CH_2 —CF_2 —CFCl—)_n$.

The homogeneous copolymers thus obtained have a high degree of flexibility, however, their melting point decreases as the number of $—CF_2 —CFCl$ groups increases in the macromolecular chain. In addition, when 15% by weight of $C_2F_3Cl$ in the copolymer is exceeded, elastomers are formed, which in homogeneous structure, are known as products which have weak resistance to rupture and to discharge threshold, but of high tensile strength.

SUMMARY OF THE INVENTION

A copolymer of vinylidene fluoride and chlorotrifluoroethylene is provided wherein the heterogeneous structure of the particles is comprised of nodules of a copolymeric homogeneous elastomer of vinylidene fluoride and chlorotrifluoroethylene dispersed in a matrix and chemically bonded thereto, the matrix being formed of a quasi-polymer of vinylidene fluoride.

The copolymer is obtained by copolymerization in suspension or emulsion in two stages, one of which involves the copolymerization of vinylidene fluoride and chlorotrifluoroethylene and the other the polymerization of vinylidene fluoride.

DETAILED DESCRIPTION OF THE INVENTION

The copolymer according to the invention has the characteristic of possessing at the same time a good flexibility and a melting temperature approximate to that of the PVDF. As has already been indicated, the copolymer according to the invention is a copolymer of $VF_2$ and $C_2F_3Cl$ wherein the heterogeneous structure of the particles is comprised of nodules of homogeneous copolymeric elastomer of $VF_2$ and $C_2F_3Cl$ dispersed in a matrix formed by a quasi-polymer of $VF_2$. While being dispersed in the matrix, the nodules are closely bonded by the chemical bonds due to the copolymerization of the monomers.

The elastomer that constitutes the nodules is a homogeneous copolymer of the type ($—CF_2 —CH_2 —CF_2 —CH_2 —CF_2—CFCl—)_n$ wherein the $—CF_2 —CFCl$ group of the $C_2F_3Cl$ employed represents by weight from about 15 to about 70%, preferably from about 23 to about 45% of the elastomer.

This elastomer is dispersed in a matrix constituted by a quasi polymer of $VF_2$ This matrix is called quasi polymer, for, as it is explained in the preparation process below, the matrix closely bonded to the nodule is constituted, at the interface bonding the quasi polymer to the nodule, of a copolymer of $VF_2$ and $C_2F_3Cl$ of which the $C_2F_3Cl$ diminishes as the surface of the particle is approached, the copolymer being progressively and rapidly replaced by almost pure PVDF. The presence of almost pure PVDF in the quasi polymer is due to the essentially total elimination in the reaction medium of $C_2F_3Cl$ after preparing the elastomer that represents the nucleus. It is evidently recommended to have a minimum of $C_2F_3Cl$ in this quasi polymer which must be ideally comprised of essentially all PVDF.

This quasi polymer of PVDF usually represents, by weight, from about 45% to about 90% of the final heterogeneous copolymer. The total amount of $C_2F_3Cl$ in the heterogeneous copolymer preferably represents from about 5% to about 15% by weight.

The original structure of the copolymer can be confirmed by electronic microscopy. The confirmation method consists in revealing the elastomer nodules by a selective solvent, preferably methylethylketone. The copolymer, preferably in the form of granules for facilitating the manipulation, is coated by a resin cut in fine laminae on the order of less than 100 nanometers by a microtome. The laminae are soaked for about twelve hours in the solvent at room temperature. The solvent selectively dissolves the elastomer of $VF_2 —C_2F_3Cl$.

Figure 1:
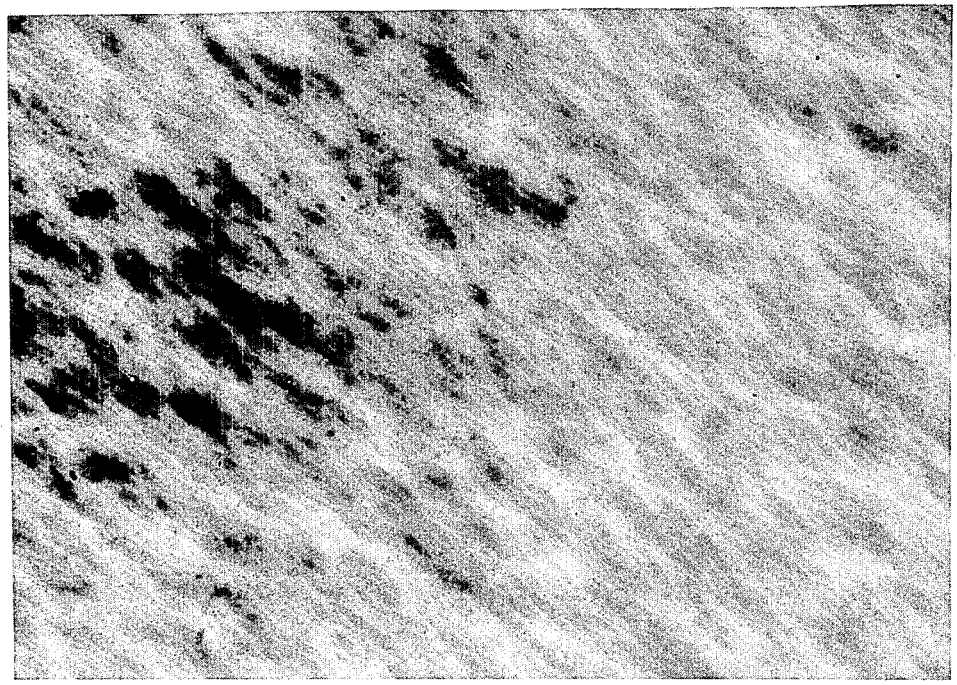
FIG. 1 is a micrograph (25,000 magnification) of a known homogeneous copolymer having a total weight of $C_2F_3Cl$ of 8%.
Figure 2:
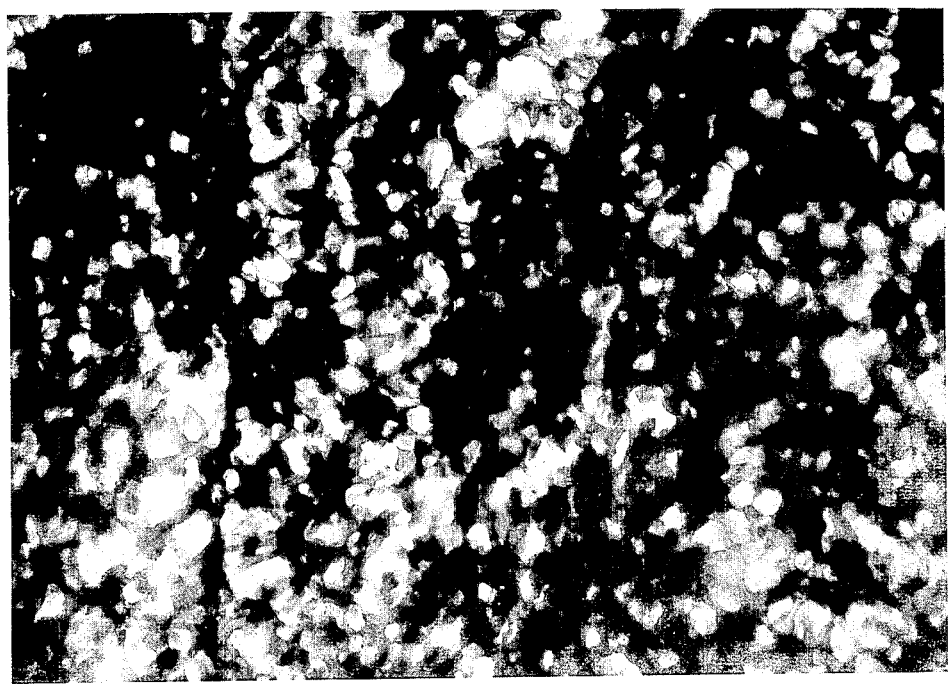
FIG. 2 is a micrograph (25,000 magnification) of a heterogeneous copolymer having a total weight of $C_2F_3Cl$ of 8% and which has been prepared in accordance with the present invention.

FIGS. 2 and 2 are micrographs (enlarged 25,000 times) corresponding respectively to a homogeneous copolymer of the prior art having a total 8% by weight of $C_2F_3Cl$ and to a heterogeneous copolymer according to the invention having a total 8% by weight of $C_2F_3Cl$, and showing the difference of structure of the products. According to FIG. 2, it is observed that there exists nodules coated with polymer represented by holes of a dimension from about 0.1—about 0.4 micron corresponding to the place occupied by the elastomer prior to its dissolution. On the other hand, FIG. 1 shows only a perfectly homogeneous film. Nuclear magnetic resonance (NMR), analysis of the dry extract of the selective solvent, indicated that it is really an elastomer of $VF_2$—$C_2F_3Cl$ containing most of the —$CF_2$—$CFCl$— groups of the whole of the copolymer.

When the melting temperature of the PVDF, measured by differential thermal analysis, is on the order of 160°-169° C., the melting temperature of the heterogeneous copolymers according to the invention is now on the order of from 160° C. -169° C., that is, within limits approximate to that of the PVDF while possessing a flexion module that can be lowered to less than 50% of that of the PVDF.

By way of comparison between a homogeneous copolymer and a copolymer according to the invention, the respective melting points are 153° and 168° C. for a total content by weight of $C_2F_3Cl$ of 8% and 144° and 164° C. for a total content by weight of $C_2F_3Cl$ of 12%.

The copolymer according to the present invention can be obtained by copolymerization in emulsion or suspension, $C_2F_3Cl$ and $VF_2$, the principle here being the following: in a first stage there is copolymerized in the $VF_2$, the $C_2F_3Cl$ that is progressively introduced in the medium in a proportion sufficient for obtaining a homogeneous elastomer, then, in a second stage, the polymerization reaction of the $VF_2$ is continued, stopping the supply of $C_2F_3Cl$ and eventually adding $VF_2$ if the whole of the $VF_2$ used has not been initially introduced in the reactor. The essence of the copolymerization process is that in the stage of preparation of the elastomer, the proportion by weight of $C_2F_3Cl$ used in relation to the copolymerizable $VF_2$ should be at least equal to 15% and at most preferably on the order of 70%.

Even though for the sake of convenience, it may be preferable to form the nodules of elastomer of $VF_2$—$C_2F_3Cl$ prior to the PVDF matrix, it is not ruled out to polymerize in a first stage the $VF_2$, then, at a chosen degree of homopolymerization, to introduce for the second stage the $C_2F_3Cl$ to form the nodule of elastomer.

In the copolymerization of the $C_2F_3Cl$ and the $VF_2$, the ratio of relative reactivity of each monomer is quite different and the consumption of $C_2F_3Cl$ has been found to be much more rapid than that of $VF_2$. That is why in order to obtain in this stage of copolymerization a homogeneous compound, it is indispensable to introduce the $C_2F_3Cl$ progressively into the reaction medium.

This progressive introduction can be effected by any means known either continuously or discontinuously by programmed successive additions as a function of the reactivity speed of the reaction medium and so as to preserve the homogeneity of said medium. It is recommended to form particles of elastomer of from 0.05 to 0.5 micron and more preferably from 0.1 to 0.2 micron.

The two stages of the process are described below in more detail:

In the usual conditions of the polymerization in emulsion of the $VF_2$, the work is carried out in a reactor, while stirring, in aqueous medium containing an emulsifier selected among the customary emulsifiers. The polymerization reaction is started by an initiator of hydrosoluble free radicals usually selected from among the alkaline persulfates. The reaction temperature is generally comprised between about 60° and about 100° C. for pressures of from about 60 to about 100 bars. The $VF_2$ can be initially all introduced into the reactor, or only a portion of the charge can be introduced and the remaining $VF_2$ being added progressively in the course of polymerization in order to maintain constant the pressure in the reactor. In the copolymerization stage the $C_2F_3Cl$ is progressively introduced taking into consideration the difference of reaction speed of the $VF_2$. It is possible simultaneously to introduce the $VF_2$ and the $C_2F_3Cl$, but in this case the delivery of $C_2F_3Cl$ has to be regulated in a manner such that the formation of $C_2F_3Cl$ patterns be controlled in relation to the formation of $VF_2$ patterns. In this copolymerization stage, it is not essential to prepare a strictly homogeneous elastomeric copolymer, but it is necessary that in its composition the content by weight of $C_2F_3Cl$ be at least 15%.

In the copolymerization stage, there is formed from 10 to 55% by weight of the total of the product formed in the two stages. The copolymerization stage is deemed terminated after the introduction of $C_2F_3Cl$ is discontinued.

In the preferred case where the first stage consists in copolymerizing the $VF_2$ and $C_2F_3Cl$ for forming the nodules of elastomers, there is produced in the second stage, after discontinuing the introduction of $C_2F_3Cl$, a progressive exhaustion of the amount of $C_2F_3Cl$. The effect of this exhaustion is to coat the particles of latex of elastomer with layers of quasi polymer of $VF_2$ increasingly poor in $C_2F_3Cl$, the final layers being essentially the homopolymer of $VF_2$. The conditions of polymerization of the $VF_2$ in the stage of formation of the quasi polymer may be different from those of the stage of formation of the elastomer insofar as these conditions correspond to the hypercritical state of the $VF_2$. This state of formation of the quasi polymer is customarily carried out at a temperature comprised between 50°-90° under a pressure of from 50 to 90 bars.

As in the classical polymerizations, the molecular weights of the products of each one of the stages are adjusted by means of transfer agents such as ketone, esters with from $C_3$ to $C_8$, chlorinated or brominated derivatives and others.

The latex of heterogeneous copolymer finally obtained is recovered and transformed under the conditions customary for polymerizations in emulsion.

The heterogeneous polymer according to the invention can also be obtained by the process of polymerization in suspension.

Under the usual conditions of the polymerization in suspension, the work is carried out in a reactor, while stirring, in aqueous medium in the presence of a protective colloid and an organosoluble starting agent or initiator.

The starting agents most commonly used are the alkyl percarbonates with from $C_2$ to $C_6$ and the tertiary butyl perpivalate.

The protective colloid is chosen among those known and used in polymerization of this kind. By way of example there are the polyvinyl alcohols, the methyl celluloses, the hydroxypropyl celluloses and the like.

The polymerization temperature is comprised between about 30° and about 90° C. and the pressure between 50 and 100 bars.

Although all of the $VF_2$ can be introduced initially in the reactor, it may be preferable to introduce initially only part of the charge, the remaining $VF_2$ being added progressively in the course of polymerization so as to maintain a constant pressure within the reactor. In the copolymerization stage the $C_2F_3Cl$ is progressively introduced, considering the difference of speed of reaction with the $VF_2$. It is possible simultaneously to introduce the $VF_2$ and the $C_2F_3Cl$, but in this case the delivery of $C_2F_3Cl$ has to be regulated in a manner such that the formation of $C_2F_3Cl$ patterns be controlled in relation to the formation of $VF_2$ patterns. In this copolymerization stage, it is not indispensable to form a strictly homogeneous elastomeric copolymer, but it is necessary that in the composition thereof the content by weight of $C_2F_3Cl$ be at least 15%.

In the copolymerization stage there is formed from 10 to 55% by weight of the total copolymer formed in the two stages.

The copolymerization stage is deemed terminated after the introduction of $C_2F_3Cl$ is halted.

The polymerization conditions of the $VF_2$ in the stage of formation of the quasi polymer can be different from those of the stage of formation of the elastomer insofar as these conditions correspond to the hypercritical state of the $VF_2$. Usually this stage of formation of the quasi polymer is carried out at a temperature comprised between 50°–90° C. under a pressure of from 50 to 90 bars.

As in the classical polymerizations, the molecular weights of the products of each one of the stages are adjusted by means of a transfer agent such as ketone, an ester with from $C_3$ to $C_8$, chlorinated or brominated derivatives and others. After polymerization, the polymer obtained in suspension is filtered, dried and granulated.

According to the above descriptions, the process of preparation of heterogeneous copolymer of $VF_2$ and $C_2F_3Cl$ in emulsion or suspension is characterized in that the $VF_2$ and the $C_2F_3Cl$ are copolymerized in one stage by progressively introducing the latter in the reaction medium so as to form a homogeneous elastomer and in another stage a matrix of PVDF is formed by polymerizing in situ $VF_2$, the copolymerization stage being preferably the first.

The thermoplastic polymeric products obtained according to these processes contain, based on the monomer, from 95 to 85% by weight of $VF_2$ wherein from 6 to 50% of this monomer $VF_2$ is contained in the elastomer $VF_2$—$C_2F_3Cl$, the rest forming the matrix of quasi polymer.

The examples that follow illustrate the invention without limiting it.

EXAMPLE 1

(Comparative)

In a 60 liter autoclave provided with a stirrer and a heating system, there are introduced 40 l of de-ionized water, 50 g emulsifier $C_6F_{13}C_2H_4SO_3K$, 4 g sodium pyrophosphate, 4 g potassium persulfate and 300 g paraffin with a melting point of from 54°–56° C. The temperature is regulated at 80° C. and the reactor is placed under vacuum of 700 mm Hg. There are then introduced 50 g acetone, 450 g $C_2F_3Cl$ and there is allowed a $VF_2$ pressure of 90 bars. The stirring is started and the polymerization immediately lowers the pressure. When the decrease of pressure reaches 3 bars, the pressure is increased to 90 bars by addition of $VF_2$. There is then introduced in the reaction medium 0.090 g $C_2F_3Cl$ per gram of $VF_2$ that has been introduced to cause the pressure to rise from 87 to 90 bars. The $VF_2$ is introduced at a speed of 3 kg/h. After having introduced 6 kg of $VF_2$, there are added 400 g acetone and 1 g potassium persulfate. After having introduced 18 kg of $VF_2$ and 1,620 kg of $C_2F_3Cl$, the reactor is degasified. There is obtained a latex with 37% dry extract, of homogeneous composition by microscopy, with a weight rate of 8% of $C_2F_3Cl$ measured by RMN analysis of the extraction with methylethyl ketone.

The results of the measurements made on this product are given in the table following Example 5.

EXAMPLE 2

In a 60 liter autoclave, there are introduced 40 l de-ionized water, 40 g emulsifier of the formula $C_6F_{13}C_2H_4SO_3K$, 4 g sodium pyrophosphate, 4 g persulfate and 500 g paraffin having a melting point between 54° and 56° C. The temperature is adjusted at 80° C. and the reactor is placed under vacuum of 700 mm mercury.

There are then introduced 50 g acetone, 500 g $C_2F_3Cl$ and there is allowed a $VF_2$ pressure of 90 bars.

The start of the stirring marks the beginning of the polymerization and causes the pressure to lower. When the pressure lowers to 3 bars, $VF_2$ is introduced in a uniform manner to raise the pressure and keep it at 90 bars.

There is then introduced the $C_2F_3Cl$ at a rate of 0.3 g $C_2F_3Cl$ per gram of $VF_2$ introduced to raise the pressure and keep it at 90 bars in the reactor. After an addition of 6 kg $VF_2$ for raising the pressure and keeping it at 90 bars and of 1.8 kg $C_2F_3Cl$, the supply of $C_2F_3Cl$ is discontinued and there are added 400 g acetone and 1 g potassium persulfate, then 12 kg $VF_2$ at a speed that allows keeping the pressure at 90 bars. The speed at which the $VF_2$ is introduced is on the order of 3 kg/h during and after the addition of the $C_2F_3Cl$. The reactor is degasified, and there is obtained a latex having 36% dry extract, of heterogeneous composition by microscopy, containing a total amount of 8% by weight of $C_2F_3Cl$. The copolymer obtained contains 35% by weight of nodules which themselves contain about 22.8% by weight of petterns originating from the $C_2F_3Cl$ measured by RMN analysis of the extraction with methylethyl ketone.

The results of the measurements made on this product are given in the table following Example 5.

EXAMPLE 3

In a 60 liter autoclave, there are introduced 40 l de-ionized water, 40 g emulsifier of the formula $C_6F_{13}C_2H_4SO_3K$, 4 g sodium pyrophosphate, 4 g persulfate and 500 g paraffin having a melting point between 54° and 56° C. The temperature is adjusted at 80° C. and the reactor is placed under vacuum of 700 mm mercury. There are then introduced 50 g acetone, 1100 g $C_2F_3Cl$ and there is allowed a $VF_2$ pressure of 90 bars. The start of the stirring marks the beginning of the polymerization and causes the pressure to lower. When the pressure lowers to 3 bars, $VF_2$ is introduced uniformly to raise the pressure and keep it at 90 bars. The $C_2F_3Cl$ is then introduced at the rate of 0.44 g $C_2F_3Cl$ per gram of $VF_2$ that has been introduced to raise the pressure and keep it at 90 bars in the reactor. After having added 4.10 kg of $VF_2$ to raise the pressure and keep it at 90 bars in the reactor and 1.84 kg of $C_2F_3Cl$, the delivery of $C_2F_3Cl$ is discontinued, and there are added 400 g acetone, 1 g potassium persulfate and then 8.4 kg $VF_2$ at a speed allowing the pressure to be kept at 90 bars. The speed at which the $VF_2$ is introduced is on the order of 3 kg/h while $C_2F_3Cl$ is being added and thereafter. The reactor is degasified and there is recovered a latex having 37% of dry extract, of heterogenous composition by microscopy and containing a total amount of 14% by weight $C_2F_3Cl$. The copolymer obtained contains 45% by weight of nodules which themselves contain about 31% by weight of patterns originating from $C_2F_3Cl$ measured by RMN analysis of the extraction with methylethyl ketone.

The results of the measurements made on this product are given in the table following Example 5.

EXAMPLE 4

In 60 a liter autoclave, there are introduced 40 l deionized water, 40 g emulsifier of the formula $C_6F_{13}CH_2SO_4K$, 4 g sodium pyrophosphate, 4 g persulfate and 500 g paraffin having a melting point between 54° and 56° C. The temperature is adjusted at 80° C. and the reactor is placed under vacuum of 700 mm of mercury. There are then introduced 50 g acetone, 600 g $C_2F_3Cl$ and a $VF_2$ pressure of 90 bars is allowed.

The start of the stirring marks the beginning of the polymerization and causes the pressure to lower. Then the pressure lowers to 3 bars, $VF_2$ is uniformly introduced to raise the pressure and keep it at 90 bars. There is then introduced the $C_2F_3Cl$ at a rate of 0.3 g $C_2F_3Cl$ per gram of $VF_2$ that has been introduced to raise the pressure and keep it at 90 bars in the reactor. After having added 5.46 kg $VF_2$ for raising the pressure and keeping it at 90 bars in the reactor and 1.64 kg $C_2F_3Cl$, the delivery of $C_2F_3Cl$ is discontinued and there are added 400 g acetone and 1 g potassium persulfate, then 6.82 kg $VF_2$ at a speed that allows keeping the pressure at 90 bars. The speed at which $VF_2$ is introduced is on the order of 3 kg/h while the $C_2F_3Cl$ is being added and thereafter. The reactor is degasified and there is recovered a latex having 33% of dry extract of heterogeneous composition by microscopy containing a total amount of 12% by weight $C_2F_3Cl$. The copolymer obtained contains 53% by weight of nodules that themselves contain about 22.6% by weight of patterns originating from the $C_2F_3Cl$ measured by RMN analysis of the extraction with methylethyl ketone.

The results of the measurements made on this product are given in the table following Example 5.

EXAMPLE 5

In a 60 liter autoclave, there are introduced 40 l deionized water, 40 g emulsifier of the formula $C_6F_{13}CH_2SO_4K$, 4 g sodium pyrophosphate, 4 g persulfate and 500 g paraffin having a melting point between 54° and 56° C. The temperature is adjusted at 80° C. and the reactor is placed under vacuum of 700 mm of mercury. There are then introduced 50 g acetone, 600 g $C_2F_3Cl$ and a $VF_2$ pressure of 90 bars is allowed.

The start of the stirring marks the beginning of the polymerization and causes the pressure to lower. When the pressure lowers to 3 bars, $VF_2$ is uniformly introduced for maintaining the pressure at 90 bars.

There is then introduced the $C_2F_3Cl$ at a rate of 0.3 g $C_2F_3Cl$ per gram of $VF_2$ that has been introduced for raising the pressure and keeping it at 90 bars in the reactor. After having added 2.74 kg $VF_2$ for raising the pressure and keeping it at 90 bars in the reactor and 0.82 kg $C_2F_3Cl$, the delivery of $C_2F_3Cl$ is discontinued and there are added 400 g acetone, 1 g potassium persulfate, then 8.72 kg $VF_2$ at a speed that allows keeping the pressure at 90 bars. The speed at which the $VF_2$ is introduced is on the order of 3 kg/h while the $C_2F_3Cl$ is being added and thereafter, the reactor is degasified and there is recovered a dry extract of heterogeneous composition by microscopy containing a total amount of 7.4% by weight of $C_2F_3Cl$. The copolymer contains 32% by weight of nodules that themselves contain about 23% by weight of patterns originating from $C_2F_3Cl$ measured by RMN analysis of the extraction with methylethyl ketone.

The results of the measurements made on this product are given in the table that follows:

| Ref. | Melting Temperature by differential thermal analysis | MPa Module of Elasticity under flexion |
|---|---|---|
| Example 1 | 153 | 800 |
| Example 2 | 168 | 805 |
| Example 3 | 163 | 414 |
| Example 4 | 164 | 530 |
| Example 5 | 168 | 829 |
| Pure PVDF (Foraflon 1000 HD) | 169 | 1700 |

What is claimed is:

1. A heterogeneous copolymer of vinylidene fluoride and chlorotrifluoreothylene, comprised of nodules of a homogeneous copolymeric elastomer of vinylidene fluoride and chlorotrifluoroethylene dispersed in a matrix and chemically bonded thereto, said matrix being formed by a quasi polymer of vinylidene fluoride.

2. A copolymer according to claim 1, wherein said quasi polymer represents from about 45 to 90% by weight, and the total amount of chlorotrifluoroethylene represents from about 5 to about 15% by weight of said heterogeneous copolymer.

3. A copolymer according to claim 1 wherein said elastomer contains from 15 to 70% by weight of $-CF_2-CFCl-$ group.

4. A copolymer according to claim 1 wherein the size of nodules of elastomer is between about 0.05 and about 0.5 micron.

5. A copolymer according to claim 1 wherein the melting point, of said copolymer, measured by differential thermal analysis, is between about 160° and about 170° C.

* * * * *